May 28, 1968     F. C. MENNEN     3,385,681
SELF-STARTING CHARCOAL BRIQUETTE AND METHOD OF MAKING THE SAME
Filed Dec. 17, 1963
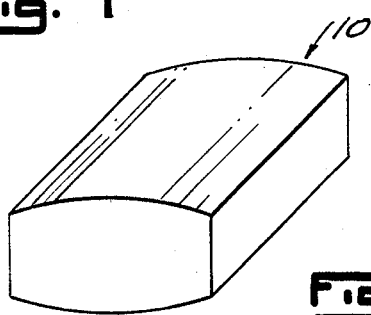
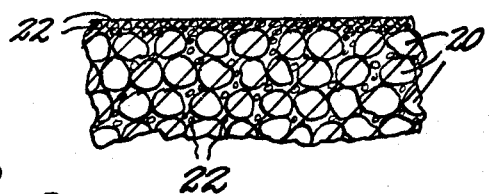
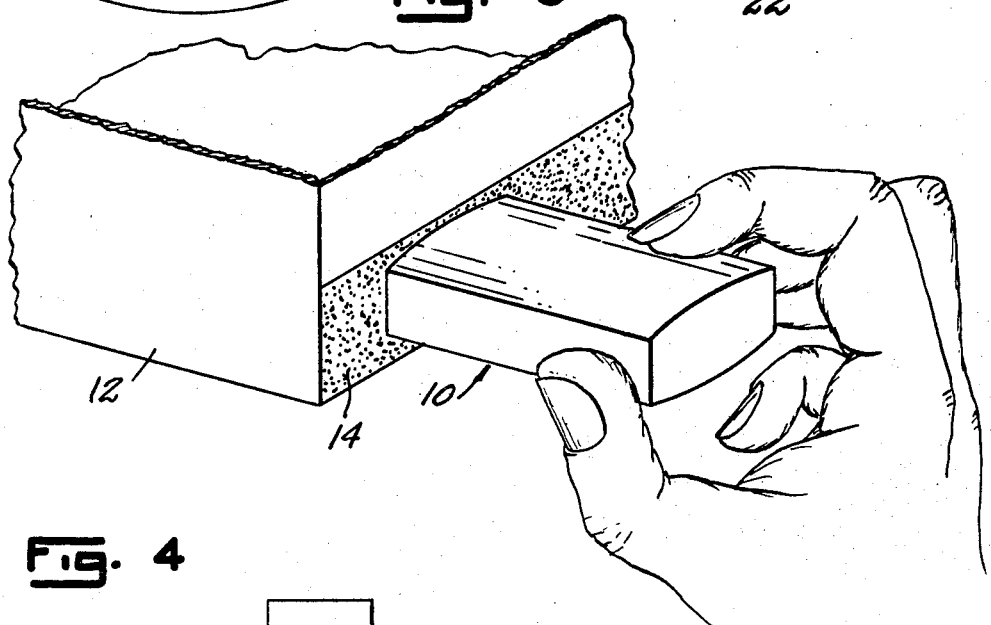
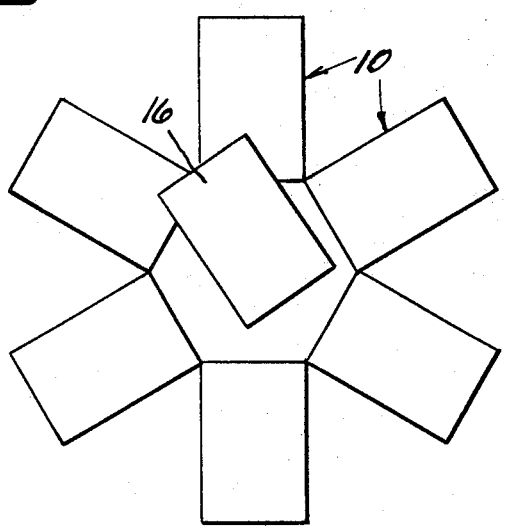
INVENTOR.
FREDERICK C. MENNEN
BY
ATTORNEY United States Patent Office 3,385,681
Patented May 28, 1968

3,385,681
SELF-STARTING CHARCOAL BRIQUETTE AND
METHOD OF MAKING THE SAME
Frederick C. Mennen, Michigan City, Ind., assignor to
United States Packaging Corporation, La Porte, Ind., a
corporation of Indiana
Filed Dec. 17, 1963, Ser. No. 331,146
7 Claims. (Cl. 44—17)

This invention relates to a self-starting charcoal briquette and a method of making the same.

Charcoal briquettes are commonly employed as fuel for use in cooking, as in grills and hibachis. The use of ordinary charcoal briquettes is characterized by slow ignition of the same to a point at which a quantity or bed of the charcoal briquettes is uniformly ignited and generates heat sufficient to cook or broil meat positioned on a grill thereabove. Because of the slow ignition and the need to insure uniform combustion, it is customary to employ a substantial number of charcoal briquettes capable of generating heat far in excess of the requirements for a given cooking or broiling project, that is, for cooking or broiling a selected quantity of meat or food. The existence of this bed of burning fuel after use thereof has ended presents problems of disposal in a manner to avoid a fire hazard. Also the tendency to use excessive quantities of the charcoal briquettes is wasteful.

The difficulty in effecting ignition of charcoal briquettes has led to the marketing of various types of starters adapted to be applied to the charcoal to accelerate ignition thereof, and it has also led to the offering of charcoal briquettes impregnated with starter materials of volatile character. The starter materials used are sometimes in liquid form and sometimes in jell form and they vary widely as to their efficiency and generally are expensive. Some starter materials are also extremely dangerous and their use has sometimes caused injuries to the user, such as the loss of arms and fingers or the loss of eyesight. Even with the use of starters in the most effective manner, substantial periods of time are required to produce a bed of burning coals in the condition best suited for cooking and broiling purposes, inasmuch as initial ignition entails burning of the starter material and a substantial period of time is required before the desired burning condition of the briquettes themselves occurs.

It is the primary object of this invention to provide a charcoal briquette which will overcome the disadvantages of prior charcoal briquettes, as mentioned above, and which will make possible rapid ignition of charcoal briquettes in condition required for use thereof for cooking purposes.

A further object is to provide a charcoal briquette that contains starter material which not only initiates ignition or combustion but also insures rapid combustion throughout the briquette and sustains such combustion.

A further object is to provide a charcoal briquette with a starter of the character which supplies its own oxygen for progressive maintenance of combustion and for effecting rapidly and safely the state of full or glowing combustion desirable for cooking purposes.

A further object is to provide a charcoal briquette which does not require ignition by a flame and, instead, can be ignited by movement thereof in contact with a friction surface.

A further object is to provide a novel method of producing a charcoal briquette having an oxygen supplying starter material incorporated therein, which method can be performed economically and at a high rate of production and with minimum risk or danger to workmen.

Other objects will be apparent from the following specification.

In the drawing:

FIG. 1 is a perspective view of a charcoal briquette embodying my invention;

FIG. 2 is an enlarged fragmentary sectional view of a charcoal briquette embodying my invention;

FIG. 3 is a perspective view illustrating the manner in which a charcoal briquette embodying my invention may be ignited;

FIG. 4 is a plan view illustrating the manner in which my new charcoal briquettes may be arranged to utilize a minimum number thereof for a given cooking function and to insure rapid ignition of all of the briquettes.

Referring to the drawing, the numeral 10 designates a briquette which is adapted to be contained in a suitable package 12 having a capacity to receive a given quantity of briquettes. The package 12 preferably has a surface or strip 14 thereof constituting a friction surface against which a briquette may be rubbed, as illustrated in FIG. 3, as hereinafter described.

The briquettes 10 are preferably composed of granular charcoal, having mixed therewith a combustion initiating and sustaining agent and a binder.

The granular charcoal 20 is preferably a hardwood charcoal of retort grade. This type of charcoal is preferred because it produces minimum odor while burning. It will be understood, however, that other charcoal, such as lignites and kiln charcoal, may be used, particularly in cases where the characteristic odors thereof are not objectionable, or where means are utilized to mask such odors. The charcoal is preferably of a particle size which will pass through screens in the range from No. 20 to No. 50. Charcoal of smaller particle size is objectionable because it is too elastic to be pressed into a briquette form, is dusty and tends to cause briquettes formed thereof to crack. Charcoal particles of a size larger than that will pass through a No. 20 mesh are objectionable because of excessive porosity of the briquette formed therefrom and difficulty in producing the desired homogeneous character of the briquette. I prefer to employ charcoal of a size to pass through a No. 36 mesh screen because this appears to produce a briquette of the correct porosity to support ignition and combustion and to facilitate rapid machine production of briquettes.

The material 22 employed in the briquettes to initiate and sustain combustion and to supply oxygen for the support of combustion is preferably granular potassium chlorate or potassium perchlorate. The selected material will preferably be of a fineness which will permit it to pass through a screen in the size range of No. 100 mesh to No. 200 mesh screens.

The binder used in the briquettes may be any organic binder in solution in a wide range of binders including hydroxylpropylmethyl cellulose, magnesium aluminum silicate, dextrin, gum arabic, gum tragacanthe, gum guar, gum karaga, locust bean gum, agar agar, and okra gum. Also usable in binder solutions are starches of all types, polyvinyl alcohol, sodium carboxymethylcellulose, dextrose, gelatine, glucose, Carbowax, molasses, lactose, pitch or asphaltum, sulphite waste liquor (lignon or gulac), sucrose, beeswax and ethylene maleic anhydride. The binder used will preferably be in a solution which will facilitate substantially uniform wetting of a briquette-forming material thereby, with resultant uniformity of a briquette structure.

The proportions in which the various components of the charcoal briquette are utilized are preferably substantially as follows: charcoal 84% to 88% by weight and ignition initiating and sustaining material approximately 12% to 16% by weight. The binder solution will preferably be utilized in the minimum quantity necessary to bind the other two components and to produce a firm coherent briquette when pressed into briquette form. The amount of moisture utilized will preferably also be the minimum quantity needed for the purpose of uniformly dispersing the binder with the other components which make up the briquette.

One preferred composition of the briquette consists of:
No. 36 screen size granular hardwood retort charcoal in the amount of 686 grams or 84.77% by weight of a briquette forming batch;
No. 100 to 200 screen size potassium chlorate in the amount of 120 grams or 15.23% by weight, per batch; and a
1% binder solution of hydroxylpropylmethylcellulose, 130 cc. per batch, with 16.4% moisture by weight.

The 1% binder solution may be prepared by dissolving 11.97 grams of hydroxylpropylmethyl cellulose in 400 cc. water at 175° F., followed by stirring thereof until dissolved, with the solution then being diluted to make up 1170 cc. by adding 770 cc. of cold water.

The process of producing a briquette from the components in the range of proportions above named entails placing of the charcoal in a blender, such as a ribbon-paddle type of blender whose paddles or blades are revolved after the charcoal is introduced therein. While the blender blades are rotating, the granular potassium chlorate or other combustion initiating material is introduced therein onto the charcoal by passing said combustion initiating material through a No. 40 vibrating screen. The rotation of the blender blades is then continued for a period of time sufficient to insure complete mixture of the combustion initiating material in the charcoal which can be accomplished by operation of the blades for five minutes or more. After mixture of the combustion initiating material with the charcoal in the blender, the binder solution is sprayed into the charcoal-combustion initiating material mixture while the blade rotation in the blender continues for an additional period of time, such as ten minutes.

The mixture so prepared is then removed from the blender and placed in tablet-forming equipment of well known character and capable of applying high pressure, such as a pressure of 15,000 pounds per square inch. However, the pressure applied varies inversely to the amount of the binder used, and pressures in the order of 10,000 pounds per square inch may be utilized if more than 130 cc. of the 1% binder solution is employed in the preferred batch formula above mentioned. After the briquettes have been formed by pressure in the tablet-forming equipment, they are placed in a forced draft air oven to dry. I prefer to heat the briquettes at 70° C. for thirty minutes to two hours or more. However, the oven temperature may range from 65° C. to 75° C., and the period of time required for retention of the briquettes to dry them will vary in proportion to the moisture content and inversely to the temperature in the oven. After the briquettes have been dried, they are ready for packaging in the container 12. The package 12 should preferably be of a character to protect the briquettes against excessive humidity and, for this purpose, the package may be over-wrapped with cellophane or metal foil.

In one preferred form, the briquettes produced are of dimensions in the order of three-quarter inch thick, one and one-half inches wide, and two and one-half inches long. To produce such briquettes of the preferred composition above mentioned, the briquette-forming cavities of the tablet-forming machine each receive approximately 32 grams of the charcoal, combustion initiating material and binder mixture to be compacted. After the material has been subjected to pressure and dried, the weight per briquette is reduced to approximately 27 grams.

In the preparation of the briquette-forming composition, the selection of a quantity of potassium chlorate or potassium perchlorate in the range of 12% to 16% of the total composition by weight is controlled by the following considerations. If the percentage of potassium chlorate or potassium perchlorate substantially exceeds 16%, very rapid ignition of the briquette will result, and a tendency of the briquette to break up or blow apart during ignition and combustion results. If the percentage of this material is less than 12% by any substantial amount, reduction of the rapidity and uniformity of occurrence of combustion throughout the briquette results, so that a longer period of time than is desired is required for effectuating the desired uniform combustion condition necessary for cooking purposes. The particle size of the potassium chlorate and potassium perchlorate is important, as I have found that, if the same is too fine, that is, of a fineness which will pass through a screen finer than 200 mesh, agglomerates are caused to form within the briquettes and to produce breaking or blow-apart of the briquettes during ignition and combustion. On the other hand, if the particle size is larger than will pass through a No. 100 mesh screen, for example, a particle size which will pass through a screen of 80 mesh or coarser, large sparks are caused upon ignition of the briquette and achievement of combustion throughout the briquette is either retarded or prevented from occurrence at the desired rate.

If the mixture of the granular potassium chlorate or potassium perchlorate with charcoal granules in the blender does not continue for a sufficient period of time, the briquette will not be homogeneous, and initiation of combustion therein will be sporadic and not uniform, so that an excessive period of time is required before the briquettes achive desired combustion for cooking. The humidity of the potassium chlorate or potassium perchlorate is also important and, if the same is at a humidity in excess of 50%, slow ignition and combustion at the surface will occur, thereby delaying or retarding the achievement of combustion throughout as required for cooking purposes.

The processing of the briquette mixture, as specified above, is important with reference to the moisture content thereof. Thus the oven drying of the tablets should not occur at temperatures exceeding 75° C., because this would cause rapid crystallization to take place, with an excessive rate of evaporation of "boiling" of moisture within the briquette, causing it to carry the potassium chlorate or potassium perchlorate component to the surface in excessive quantities. Consequently, rapid surface burning of the briquette would occur, but combustion internally or throughout the briquette wold be delayed or retarded. Drying at temperatures below 65 deg. C. will not adversely affect the product if it is continued long enough to properly dry the briquette, but such low drying temperatures are not practical because the drying time is excessive. I have found that drying at a temperature in th order of 70 deg. C. is most efficient and, in particular, is important because it allows a rate of drying which carries to the surface of the briquette, as a result of partial crystallization, a quantity of the potassium chlorate or potassium perchlorate sufficient to facilitate rapid ignition, as by rubbing of the briquette against a friction surface, without destroying the uniformity of dispersion of the potassium chlorate or potassium perchlorate in the briquette as needed to insure rapid combustion of the briquette throughout.

The homogeneous character of the mixture of potassium chlorate or potassium perchlorate with the charcoal granules, which is obtained by the blending thereof in the process described above, creates a dispersion of the potassium chlorate or potassium perchlorate throughout the mixture and throughout the final briquette. The potassium chlorate or potassium perchlorate is concentrated adjacent the surface of the briquette to a greater degree than throughout the interior thereof, but it is important that the poassium chlorae or potassium perchlorate be dispersed throughout the body of the briquette. Ignition of the briquette is initiated by ignition of the potassium chlorate at the surface either by rubbing of the briquette against a friction surface or by applying a flame thereto. The surface ignition of the briquette and subsequent internal combustion thereof is aided and governed by the internal dispersion of the potassium chlorate or potassium perchlorate. The extent of surface concentration of the potassium chlorate or potassium perchlorate should be sufficient to convert an initial spark or initial ignition into a flame and to support this ignition and combustion until the temperature at the surface is sufficient to ignite the potassium chlorate granules which are dispersed throughout the body of the briquette.

Once ignition of the briquette has proceeded to the point of igniting internally disposed granules of potassium chlorate or potassium perchlorate, a reaction commences entailing the decomposition of the potassium chlorate or potassium perchlorate. This reaction entails the liberation of oxygen at two stages with, in effect, two liberating reactions proceeding concurrently yet independently. These reactions can best be described as follows:

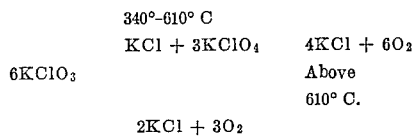

$$6KClO_3 \begin{matrix} \xrightarrow{340°-610°\ C} KCl + 3KClO_4 \rightarrow 4KCl + 6O_2 \\ \xrightarrow{Above\ 610°\ C.} 2KCl + 3O_2 \end{matrix}$$

It will be seen from the above that measurements or the relative proportions of potassium perchlorate and oxygen formed at different temperatures are different. The potassium perchlorate reaction proceeds nearly twice as fast as the other reaction. The lower the temperature, the greater the relative speed of the potassium perchlorate reaction. Therefore, as potassium perchlorate accumulates in the system, a molten mass becomes increasingly viscous or syrupy, even though the temperature thereof be lower than the melting point of the potassium perchlorate, namely 610 deg. C. The mass solidifies when enough potassium perchlorate has accumulated in the system, even though the temperature be higher than the melting point of potassium chlorate, namely 340 deg. F. When the temperature is raised high enough, the potassium perchlorate decomposes into potassium chloride and free oxygen. This peculiarity of potassium chlorate to build up into potassium perchlorate is essential for the smooth self-sustained ignition of the charcoal, as the temperature over 610 deg. F. creates a second stage at which release of large volumes of the oxygen occurs and makes the reaction self-sustaining and not dependent upon atmospheric oxygen.

The generation of oxygen within the body of the briquette, due to the reaction described above, is very important to the accomplishment of rapid complete combustion of the charcoal briquette. The charcoal is an allotropic form of carbon and is very porous. Adsorption of the oxygen liberated through the build-up of potassium perchlorate readily occurs within the briquette, and this creates a self-sustained combustion of the charcoal in a reaction that is uniform throughout the briquette, is continuous and exothermic. As a result of this reaction, the charcoal briquette reaches a glowing heat within one minute and thus eliminates the waiting for complete combustion which characterizes all prior forms of charcoal briquettes. The combustion generating reaction results in the evolution of carbon dioxide as a byproduct according to the following equation:

$$t° + 3O_2 + 3C\ 3CO_2 + 8,080\ calories$$

Assuming that the briquettes weigh 26 grams, approximately 22.2 grams thereof represents carbon. With such briquettes the B.t.u. and gram calories of heat evolved may be calculated as follows: 1 gram of charcoal upon combustion to carbon dioxide yields 8,080 calories; therefore 22.2 grams would yield a heat value of 179,376 gram calories or $$179,376\ gram\ calories \times 3,968 \times 10^{-3} = 711.6$$

B.t.u. per briquette.

The generation of poisonous carbon monoxide does not take place in the combustion of the briquette when the potassium chlorate is present as such carbon dioxide would ordinarily be generated when common charcoal briquettes are burning. This results from the fact that there is an abundant supply of oxygen during combustion at all times, due to the decomposition of the potassium chlorate. During combustion, with the carbon dioxide being expelled and the potassium chlorate being reduced to potassium chloride, there is not present any element which will cause any after taste in the food being broiled.

In instances where the granular charcoal employed is kiln charcoal or a lignite which may have a characteristic odor, it may be desired to utilize an artificial flavor or a masking agent. Artificial flavors which may be used in the briquettes include ground hickory chips. Masking agents which may be utilized include such materials offered to the trade by Dow Chemical Corporation under the trademarks "Palatone" or "Cyclotene." These artificial flavors or masking agents may be incorporated into the briquette composition to mask any initial odor of the organic binder as it decomposes. The decomposition of the binder is rapid. Thus in less than one minute the binder will decompose and thereafter any odor dissipates very quickly and is unlikely to linger and produce an undesirable odor, particularly if the briquettes are burned indoors.

One of the distinctively new characteristics of the charcoal briquette above disclosed is the ease and thoroughness with which it can be extinguished while burning. The briquette is soluble in water and, consequently, when water in any substantial quantity is applied to the briquette while burning, the briquette is caused to dissolve. This insures that water for fire-extinguishing purposes will reach all particles of the mixture constituting the briquette. No danger or delayed or hidden combustion exists for this reason, and the user is not required to maintain a long watch over the briquette after apparent extinguishment thereof as is true with conventional briquettes to which water is applied for the purpose of extinguishing the combustion thereof.

The provision of striking surface 14 upon container 12, so as to permit ignition of briquettes by rubbing thereof against such surface or against a friction surface used to ignite safety matches, is believed to be unique in charcoal briquette packaging. The striking surface 14 is applied to the container in a thin coat, preferably not greatly exceeding a thickness of one mil. Various compositions of striking compounds of the type used upon safety match containers may be utilized. A wide variety of compositions of the striking compound are available and in general may consists of red phosphorus 25% to 40%, fillers 40% to 45%, and binding material 20% by weight.

A typical formula for a friction surface material is:

| | Percent |
|---|---|
| Water | 35 |
| Animal glue | 10 |
| Gum tragacanth | 2 |
| Dextrine | 3 |
| Powdered glass | 7 |
| Asbestos powder | 2 |
| Barium chromate | 1 |
| Antimony sulphide | 12 |
| Iron oxide | 3 |
| Red phosphorus | 25 |
| Total | 100 |

The materials above mentioned are first mixed thoroughly and the mixture is then ground in an eccentric mill or a ball mill until the required fineness is obtained. The mill must be kept sufficiently warm during the grinding operation to prevent the glue from gelling. When the mixture reaches the required fineness, it can be applied to the package by any suitable means as well known in the art.

To use the briquettes, a number are placed in a grill or hibachi in circular or other arrangement so that each touches another, for example, as illustrated in FIG. 4. The user can determine the number by determining the amount of meat to be broiled, using an average of four briquettes per steak. One briquette is then ignited, as by subjecting it to a flame or by rubbing it across a friction or strike surface, such as surface 14 on container 10. The briquette instantly begins to sparkle at a controlled rate of ignition, allowing ample time for the user to place the ignited briquette 16 shown in FIG. 4 in contact with one or more of the previously arranged briquettes. The ignition of the ignited briquette 16 proceeds rapidly toward uniform combustion and, when placed in contact with other briquettes as seen in FIG. 4, the ignited briquette will ignite the other briquettes which it contacts and they in turn will ignite the briquettes which they contact, so that ignition of all briquettes is accomplished rapidly. Each briquette will ignite so rapidly and so uniformly that it will reach broiling heat within one minute, and the time required for igniting all of the briquettes of the group to be employed does not greatly exceed one minute. Original ignition of the briquettes may produce smoke caused by disintegration of the binder material, but such disintegration proceeds rapidly and the smoke disappears in a very short period of time and substantially by the time complete combustion of all of the briquettes in the group has commenced.

The homogeneous character of the briquette obtained by the operation of the ribbon blender and the finess of the granular potassium chlorate or potassium perchlorate facilitate the rapid accomplishment of complete combustion of each briquette. Likewise, the greater concentration of the potassium chlorate or potassium perchlorate at the surface of the briquette facilitates ignition of the briquette.

In the ignition of a briquette by rubbing thereof against a friction surface, the concentration of the potassium chlorate or potassium perchlorate substantially uniformly at the surface of the briquette insures reaction thereof with the phosphorus and other chemicals on the strike surface 14 of the container to effect ignition of the potassium chlorate or potassium perchlorate, and the initial ignition is then rapidly transferred throughout the briquette by the oxidation of the potassium chlorate or potassium perchlorate dispersed interiorly thereof.

Once the ignition of the potassium chlorate or potassium perchlorate commences as supported by a spark or a flame, the surface crystals of potassium chlorate or potassium perchlorate support this ignition until the temperature and ignition of the ignited crystals of potassium chlorate or potassium perchlorate is sufficient to ignite other adjacent granules of the material at the surface and also throughout the body of the briquette. The continued support of combustion which ignites the charcoal and sustains combustion thereof is supported by the liberation of oxygen, as described above. I have found that ignition of the briquettes will occur in the presence of flame or when heated to a temperature in excess of 350 deg. F.

Despite the fact that the briquettes are formed of granular material and can be ignited by friction, they have a high degree of stability for shelf life and briquette hardness while stored or packaged.

While the preferred embodiment of the invention has been illustrated and described, it will be understood that changes in the composition and the process may be made within the scope of the appended claims.

I claim:
1. A charcoal briquette formed of a compacted and dried mixture of granular charcoal of a size to pass through a screen in the range from #20 to #50 mesh and granular combustion initiating and sustaining material adhered by a binder solution, said charcoal comprising from 84% to 88% of said mixture by weight, said combustion initiating material being of the class consisting of potassium chlorate and potassium perchlorate of a finer particle size than said charcoal granules, and comprising from 12% to 16% of said mixture by weight, said combustion initiating material being dispersed throughout the interior of said briquette and being of greater concentration adjacent the surface of the briquette than in the interior thereof said binder being sufficient to bind the granular material.

2. A charcoal briquette formed of a compacted and dried mixture of granular charcoal of a size to pass through a screen in the range from #20 to #36 mesh and granular combustion initiating and sustaining material adhered by a binder solution sufficient to bind the granular material, said charcoal comprising from 84% to 88% of said mixture by weight, said combustion initiating material being of the class consisting of potassium chlorate and potassium perchlorate of a finer particle size than said charcoal granules, and comprising from 12% to 16% of said mixture by weight, said combustion initiating material being dispersed throughout the interior of said briquette and being of increased concentration at the surface of the briquette to facilitate ignition of the briquette by rubbing it against a friction surface.

3. A charcoal briquette formed of a compacted and dried mixture of granular charcoal and potassium chlorate adhered by a binder solution in the following proportions:
   686 grams of granular charcoal of a size from #20 to #50 screen mesh,
   120 grams of granular potassium chlorate of #100 to #200 screen size,
   130 cc. of 1% organic binder solution,
   said potassium chlorate being distributed throughout the interior of the briquette and being in greater concentration at the surface of the briquette.

4. A charcoal briquette comprising a dense body of charcoal granules of #20 to #50 screen size adhered together by a binder and granular material of smaller screen size than said charcoal granules and of the class consisting of potassium chlorate and potassium perchlorate distributed throughout the body to continuously sustain combustion of the entire body, said combustion sustaining material being present at the surface of the body in a greater concentration to initiate combustion thereof and of said body when said body is rubbed against a friction surface containing phosphorous, said body being absorbent and adapted to be decomposed by water while burning.

5. The method of making charcoal briquettes consisting of uniformly mixing together granular charcoal from 84% to 88% by weight of particle size from #20 mesh to #50 mesh and granular combustion initiating material of the class consisting of potassium chlorate and potassium perchlorate from 12% to 16% by weight and of particle size from #100 mesh to #200 mesh; then adding to said mixture, while continuing to agitate the mixture, a quantity of an aqueous solution of an organic binder sufficient to bind the granular material; then compacting at a high pressure selected quantities of said mixture in a mold; and then heating said compacted molded mixture in a forced draft air oven at a temperature from approximately 65° C. to 75° C. to dry the same and cause crystallization of combustion initiating material at the surface of the briquette in greater concentration than in the interior thereof.

6. The method of making charcoal briquettes consisting of uniformly mixing together granular charcoal from 84% to 88% by weight and of particle size from #20 mesh to #50 mesh and granular combustion initiating material of the class consisting of potassium chlorate and potassium perchlorate from 12% to 16% by weight and of particle size from #100 mesh to #200 mesh; then adding to said mixture by spraying, while continuing to agitate the mixture, a quantity of an aqueous solution of an organic binder sufficient to bind the granular materials; then compacting at a pressure in the order of 10,000 p.s.i. or more selected quantities of said mixture in a mold, and then heating said compacted molded mixture in a forced draft oven at approximately 70° C. for from thirty minutes to two hours.

7. The method of making charcoal briquettes consisting of uniformly mixing together granular charcoal from 84% to 88% by weight and of particle size from #20 mesh to #36 mesh and granular combustion initiating material of the class consisting of potassium chlorate and potassium perchlorate from 12% to 16% by weight and of particle size from #100 mesh to #200 mesh; then adding to said mixture, while continuing to agitate the mixture, a quantity of an aqueous solution of an organic binder sufficient to bind the granular material; then compacting at high pressure selected quantities of said mixture in a mold into briquette form, and then heating said compacted molded briquette in a forced draft oven to dry the same at a rate causing crystallization of said combustion initiating material at the surface of the briquette in greater concentration than the concentration of the combustion initiating material throughout the interior of the briquette.

References Cited

UNITED STATES PATENTS

| | | | |
|---|---|---|---|
| 868,270 | 10/1907 | Hunsinger | 44—17 |
| 1,959,472 | 5/1934 | Heffernan et al. | 44—17 X |
| 2,015,383 | 9/1935 | Konig et al. | 44—39 |

FOREIGN PATENTS

| | | |
|---|---|---|
| 229,555 | 2/1925 | Great Britain. |
| 458,515 | 12/1936 | Great Britain. |

DANIEL E. WYMAN, *Primary Examiner.*

C. F. DEES, *Assistant Examiner.*